W. J. G. YOUNG.
RAT TRAP.
APPLICATION FILED NOV. 15, 1912.
1,074,998.
Patented Oct. 7, 1913.
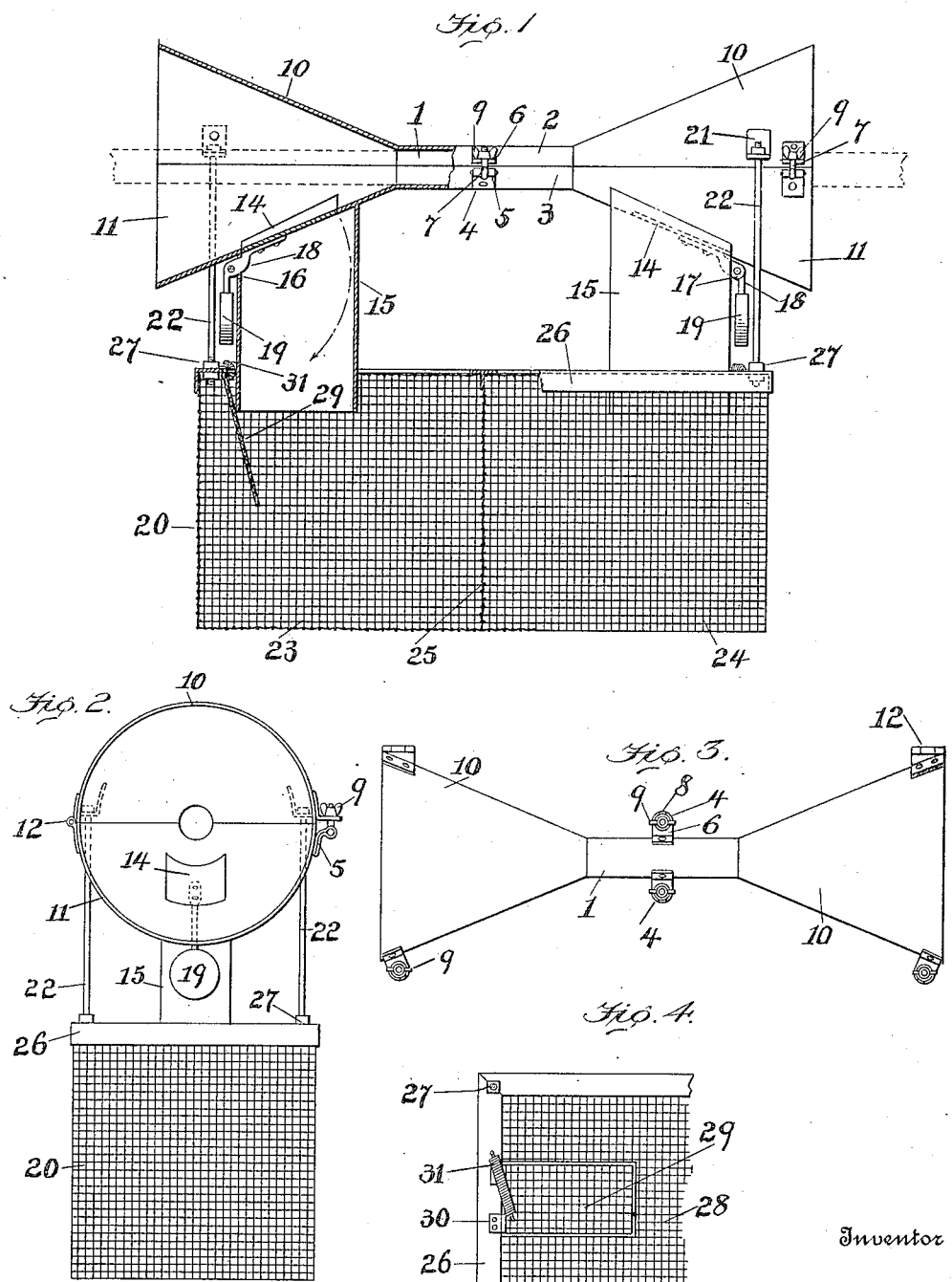

UNITED STATES PATENT OFFICE.

WILLIAM J. G. YOUNG, OF BALTIMORE, MARYLAND.

RAT-TRAP.

1,074,998. Specification of Letters Patent. Patented Oct. 7, 1913.

Application filed November 15, 1912. Serial No. 731,460.

*To all whom it may concern:*

Be it known that I, WILLIAM J. G. YOUNG, a citizen of the United States, residing at Baltimore, in the State of Maryland, have invented certain new and useful Improvements in Rat-Traps, of which the following is a specification.

This invention relates to improvements in rat traps and has particular reference to a trap to be attached to the hawser or cables which secure a ship in position, either at anchor or at a dock whereby rats or other like vermin in attempting to pass to or from the ship will be trapped.

The object of this invention is to provide an improved structure for attaching rat-traps to the hawsers that secure a ship in position.

The invention is illustrated in the accompanying drawing wherein,

Figure 1, shows a part section and a partial side elevation of a trap embodying the features of the invention. Fig. 2, illustrates an end elevation of the same. Fig. 3, shows a top plan view of that portion of the device which directly engages the hawser or cable, and Fig. 4, illustrates a top plan view of a portion of the cage of the device.

In the drawing the numeral, 1, designates a tubular sleeve comprising two sections, 2, and, 3, which are separable longitudinally and provided at each side with a clamping device, 4, of any approved form. In the present instance the clamping device, 4, and other similar devices, hereinafter to be referred to, comprise angle plates, 5, and, 6, one of which is attached to one section and the other to the other section so that a bolt, 7, may be swiveled to one plate and be swung into a slot, 8, in the edge of the other angle plate whereby a wing nut, 9, may be engaged with the bolt to hold the two sections together. Each end of sleeve section, 2, has a half hollow cone section, 10, attached thereto and each end of section, 3, also has a hollow half cone member, 11, secured thereto. The smaller ends of all the cone sections are attached or are adjacent to the ends of the sleeve sections so that the cone members flare as they extend away from the sleeve sections. It will also be seen that the cone-members at one end of the sleeve sections have their larger ends pointing away from the sleeve in one direction while the cone members at the other end of the sleeve have their larger ends pointing in a reverse direction. The cone-members, 10, and, 11, are of the same size so as to register when brought together and said members are pivotally connected in the present instance by means of hinges, 12, so that the upper sleeve and cone members may be swung open or away from the lower sleeve and cone members for a purpose presently to be explained. In order to secure the cone-members when closed together they are provided with clamping devices, 4, hereinbefore described.

Each cone-member, 11, has a trap door, 14, and directly beneath the trap door the under outer side of the members are provided with depending chutes, 15, of sufficient size to permit the trap door at the upper end of the chute to swing down into the latter. The chutes seat close against the under side of the cone-members, 11, and each chute has an opening, 16, at one side and also has pivot lugs, 17, which are only readable in Fig. 1, so that an arm, 18, may be pivoted to the said lugs and have its inner end projected through the opening, 16, to be secured to the under side of the trap door whereby to pivotally sustain the latter. The outer end of the arm, 18, depends at the outer side of the chute and is provided with a counter-balance weight, 19, which merely overbalances the trap door sufficiently to normally keep the latter in place to close the entrance to the chute from the interior of the cone member, 11.

Below the chutes, 15, there is provided a cage structure, 20, which latter is sustained, in the present instance, from the upper cone members, 10, through the medium of angle brackets, 21, and depending rods, 22. While the particular construction of the cage is not essential I prefer to construct it with two compartments, 23, and, 24, separated one from the other by a partition wall, 25. The cage in the present instance is formed of wire and has an angle-iron binder, 26, around its upper edge with which the lower ends of the depending rods, 22, are connected by means of nuts, 27. Each compartment, 23, and, 24, has an entrance opening in its top wall, 28, and a door, 29, is secured at one end by hinges, 30, to the angle-iron binder, 26, so as to allow the door to swing inwardly into the compartment. A spring, 31, serves to draw the door toward the closed position. The entrance openings to the compartments are so situated that the lower ends of the chutes, 15, may project therethrough when the cage is in position and the lower open ends of the chutes will serve to hold the doors depressed to their open position so as to allow a free and unobstructed passage from the chutes into the compartments.

In practice the sleeve sections and funnels are swung open so that a hawser or cable, see broken lines, in Fig. 1, may be seated in the sleeve sections and extended through the cone-members. The funnel sections are then closed about the hawser or cable and secured together by means of the respective clamping devices, 4. This will provide on the hawser or cable two cone shells,—one pointing in one direction and the other in a reverse direction on the hawser. The cage is then attached to the cone members by the rods 22, and the lower ends of the chutes, 15, are thus projected into the respective compartments of the cage and hold the hinged doors, 29, to their open position. When rats have been caught and it is desired to remove them from the cage, the rods, 22, must be disconnected to allow the cage, 20, to separate from the chutes, 15; when the ends of the chutes are withdrawn from the entrance holes of the cage the spring-hinged doors, 29, will automatically close and prevent escape of the rats. If a rat should attempt to crawl along the hawser from the ship one cone would intercept it and the rat upon stepping on the trap door, 14, will be dropped through the chute, 15, into the cage below after which the trap door would close. The same would be true in the case of a rat attempting to crawl from the dock onto the ship,—the only difference being that the land rats would be deposited in one compartment and the ship rats in the other compartment so that it could be ascertained if desired how many land and how many ship rats had been caged.

The utility of the device will at once be recognized by persons familiar with shipping and particularly in the cases of those ships which touch plague ports.

Having thus described my invention what I claim and desire to secure by Letters Patent is:—

1. In a rat trap for attachment to hawsers or cables of vessels, the combination of two funnels with their larger or flared ends facing in opposite directions, a tubular sleeve adapted to encircle the hawser or cable and connecting the smaller ends of said two funnels—and both the said funnels and connecting sleeve comprising two sections which are separable longitudinally; a hinge connecting the two sections of each funnel at one side of its flared end; means at the opposite side of the flared ends of each funnel to hold the two sections closed; a cage sustained below the said two funnels, and trap openings in each funnel both trap openings communicating with said cage.

2. In a rat trap for attachment to hawsers or cables of vessels, the combination of a funnel and sleeve to encircle the hawser or cable and said funnel provided in its flaring side with a trap-opening, 14, normally closed; a cage sustained below said funnel and the top of the cage provided with an entrance hole which has a spring-hinged door, 29, that opens inwardly; a chute, 15, having its upper end attached to the funnel and around the said trap-opening therein and the lower end of the chute projecting through the said entrance hole in the cage and holding the said spring-hinged door to its open position, for the purpose set forth.

3. In a rat or vermin trap for hawsers or cables of vessels the combination with an upper sleeve section; an upper cone-member at each end of the sleeve section; a lower sleeve section; a lower cone-member at each end of the lower sleeve-section; means for holding said sleeve and cone members in register about a hawser or cable; a trap in each lower cone-member and a cage below the traps.

4. In a rat or vermin trap for hawsers or cables of vessels the combination with an upper sleeve section; an upper cone-member at each end of the sleeve section; a lower sleeve section; a lower cone-member at each end of the lower sleeve section; means for pivotally connecting the upper and lower members; means for locking the sleeve and cone members about a hawser or cable; a trap in each lower cone member; a chute below each trap and a cage beneath the chutes.

In testimony whereof I affix my signature in presence of two witnesses.

WILLIAM J. G. YOUNG.

Witnesses:
CHARLES B. MANN, Jr.,
G. FERD. VOGT.

Copies of this patent may be obtained for five cents each, by addressing the "Commissioner of Patents, Washington, D. C."